US007236798B2

(12) United States Patent
Beuck (10) Patent No.: US 7,236,798 B2
(45) Date of Patent: Jun. 26, 2007

(54) SYSTEMS AND METHODS FOR OBJECT LOCATION NOTIFICATION

(75) Inventor: David P. Beuck, Allen, TX (US)

(73) Assignee: Verizon Business Global LLC, Basking Ridge, NJ (US)

(*) Notice: Subject to any disclaimer, the term of this patent is extended or adjusted under 35 U.S.C. 154(b) by 0 days.

(21) Appl. No.: 11/260,280

(22) Filed: Oct. 28, 2005

(65) Prior Publication Data

US 2006/0063540 A1    Mar. 23, 2006

Related U.S. Application Data (63) Continuation-in-part of application No. 10/761,376, filed on Jan. 22, 2004.

(51) Int. Cl.
*H04Q 7/20* (2006.01)

(52) U.S. Cl. .................. 455/456.1; 455/436; 455/444; 455/456.2; 455/456.3; 455/456.5; 455/456.6; 455/457

(58) Field of Classification Search ........ 455/436–444, 455/456.1–457, 466; 370/331–334; 701/207, 701/213–214, 216; 340/988; 342/357.01, 342/357.06, 357.12
See application file for complete search history.

(56) References Cited

U.S. PATENT DOCUMENTS

| 5,461,390 | A | * | 10/1995 | Hoshen | 342/419 |
|---|---|---|---|---|---|
| 5,594,425 | A | * | 1/1997 | Ladner et al. | 340/825.49 |
| 5,627,548 | A | * | 5/1997 | Woo et al. | 342/357.06 |
| 5,742,233 | A | * | 4/1998 | Hoffman et al. | 340/573.1 |
| 5,982,281 | A | * | 11/1999 | Layson, Jr. | 340/539.13 |
| 6,073,013 | A | | 6/2000 | Agre et al. | |
| 6,639,516 | B1 | | 10/2003 | Copley | |
| 6,650,902 | B1 | | 11/2003 | Richton | |
| 6,703,936 | B2 | * | 3/2004 | Hill et al. | 340/573.4 |
| 6,972,684 | B2 | * | 12/2005 | Copley | 340/573.4 |
| 2002/0000930 | A1 | | 1/2002 | Crowson et al. | |
| 2002/0131393 | A1 | | 9/2002 | Baldridge | |
| 2002/0170954 | A1 | | 11/2002 | Zingher et al. | |
| 2003/0054834 | A1 | | 3/2003 | Gutowski et al. | |
| 2004/0122956 | A1 | | 6/2004 | Myers et al. | |
| 2004/0176579 | A1 | | 9/2004 | Hale et al. | |
| 2004/0192304 | A1 | | 9/2004 | Casaccia et al. | |
| 2004/0203732 | A1 | | 10/2004 | Brusilovsky et al. | |
| 2004/0203893 | A1 | | 10/2004 | Kotzin | |
| 2005/0085257 | A1 | | 4/2005 | Laird et al. | |

\* cited by examiner

*Primary Examiner*—Steve M. D'Agosta (57) ABSTRACT

A system and a method for determining and reporting a location of an object are provided. The method may include receiving a message, the message including information identifying a locator device and information identifying a location of the locator device. The method may also include determining whether the locator device is within a monitored area based on the location information. The method may also include retrieving contact information based on the locator device identification when the locator device is determined to be within the monitored area. The method may also include retrieving information identifying an object associated with the locator device based on the locator device identification. In addition, the method may include generating a notification using the retrieved contact information, the notification including the object identification.

18 Claims, 10 Drawing Sheets

SYSTEMS AND METHODS FOR OBJECT LOCATION NOTIFICATION

RELATED APPLICATIONS

This application claims priority from and is a continuation-in-part (CIP) of U.S. patent application Ser. No. 10/761,376, filed Jan. 22, 2004, entitled "LOCATION FINDER," the disclosure of which is incorporated herein by reference.

FIELD OF THE INVENTION

Implementations consistent with the principles of the invention relate generally to wireless networking and, more particularly, to determining and reporting a location of an object via a wireless interface.

BACKGROUND OF THE INVENTION

Monitoring systems, such as radio frequency identification (RFID)-type systems may be used to report the movement of persons or other objects to outside of an area of confinement. For example, a person convicted of a crime may be subject to house arrest. To monitor compliance, the person may be required to wear an RFID-type device, such as an electronic bracelet, that interacts with an RFID reader used to detect the movement of the RFID-type device beyond a boundary of the house/property.

In certain circumstances, a need may exist to track the movements in public of persons or other objects that have been identified as threats. That is, a need may exist to track their movements relative to certain persons and/or particular segments of society. For example, it may be desirable to monitor an area near a children's facility for the presence of registered sex offenders. As another example, it may be desirable to monitor an area near a particular person's residence and/or workplace for the presence of an individual who is the subject of a restraining order placed on the individual by a court for the person's protection.

SUMMARY OF THE INVENTION

In an implementation consistent with the principles of the invention, a method may include receiving a message, the message including information identifying a locator device and information identifying a location of the locator device. The method may also include determining whether the locator device is within a monitored area based on the location information. The method may also include retrieving contact information based on the locator device identification when the locator device is determined to be within the monitored area. The method may also include retrieving information identifying an object associated with the locator device based on the locator device identification. In addition, the method may include generating a notification using the retrieved contact information, the notification including the object identification.

In another implementation consistent with the principles of the invention, a network device may include a database to store information associated with a locator device and an object associated with the locator device, and information associated with a monitored area. The network device may also include logic to receive a message indicating that the locator device has entered the monitored area, the message identifying the locator device, and generate a notification based on the message and the stored information associated with the locator device and the object associated with the locator device, the notification indicating a presence of the object within the monitored area.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings may identify the same or similar elements. The following detailed description does not limit the invention. Instead, the scope of the invention is defined by the appended claims and equivalents.

Overview

Implementations consistent with the principles of the invention provide a threat detection and reporting system. An object having a locator device may move to a location within a communication range of a wireless access point that is associated with a subscriber's designated location. The locator device may communicate with and obtain an identity of the wireless access point. The locator device may generate a threat detection message that includes identity information associated with the object, the locator device, and the wireless access point. The threat detection message may be sent via the wireless access point to a networked database server. The database server may process the threat detection message by performing a lookup of stored information associated with the subscriber's designated location and/or the object. The database server may generate a threat notification to be sent to a notification device based on contact information determined from the stored information.

Exemplary System

Figure 1:
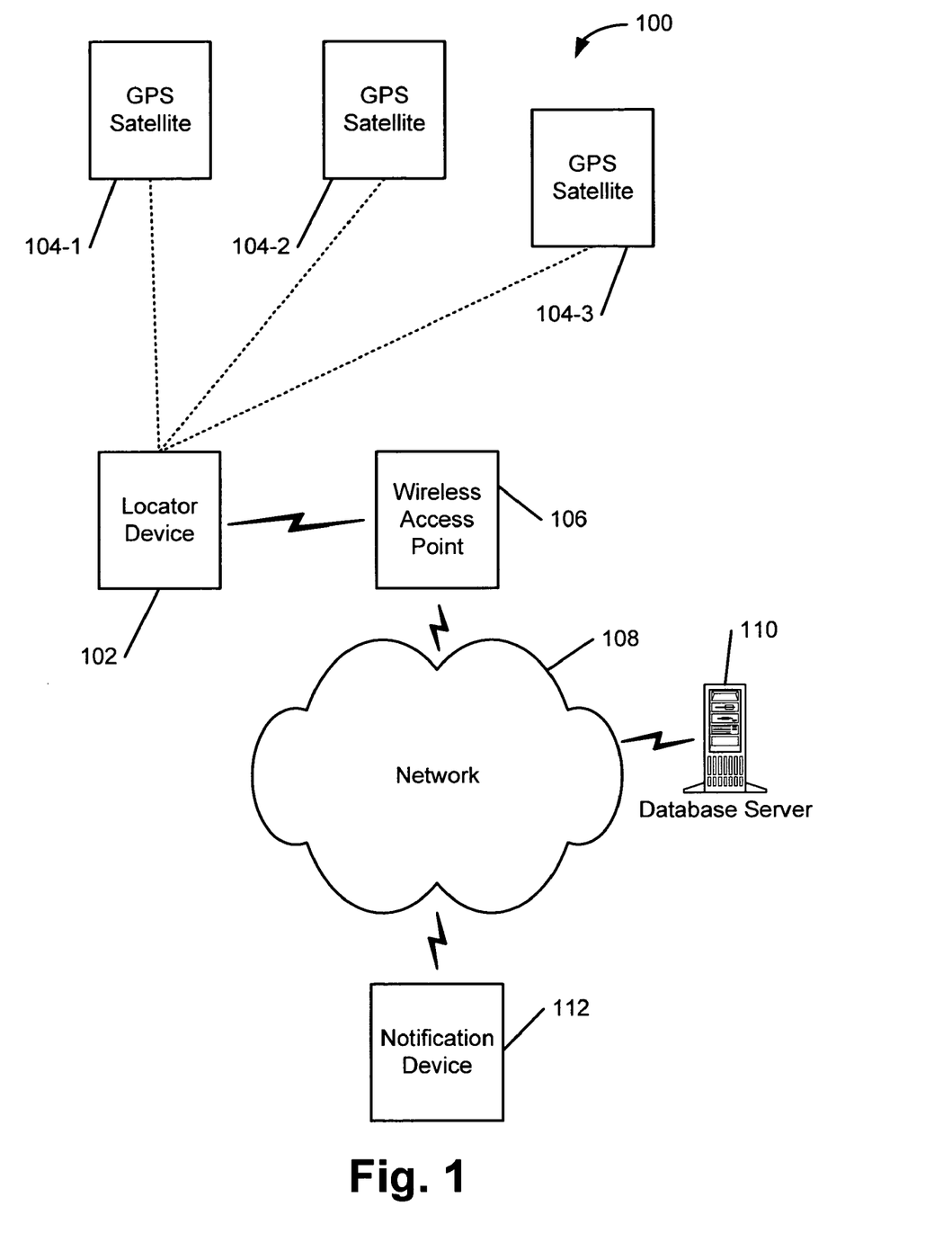
FIG. 1 illustrates an exemplary system consistent with the principles of the invention.

FIG. 1 illustrates an exemplary system 100 consistent with the principles of the invention. System 100 includes a locator device 102, global positioning system (GPS) satellites 104-1, 104-2, 104-3, a wireless access point 106, a network 108, a database server 110, and a notification device 112. The exemplary configuration illustrated in FIG. 1 is provided for simplicity. It is to be appreciated that a typical system could include more or fewer locator devices 102, GPS satellites 104-1, 104-2, 104-3, wireless access points 106, networks 108, database servers 110, and notification devices 112 than illustrated in FIG. 1.

Locator device 102 may include one or more portable terminals that may remotely communicate with and/or via wireless access point 106 and database server 110 via network 108, for example, by establishing a communication session and through an exchange of data. For example, locator device 102 may include a radio frequency identification (RFID)-based tag or transponder housed, for example, in an electronic bracelet to be attached to or worn by any mobile object (e.g., person, car, animal, etc.). Locator device 102 may also receive radio signals transmitted by GPS satellites 104-1 through 104-3. Locator device 102 may calculate geographic coordinates from the received GPS signals.

Wireless access point 106 may include one or more access devices for accessing network 108. For example, wireless access point 106 may include a router that may receive and transmit wireless and/or wired signals, or any other device that provides access to network 108. Wireless access point 106 may communicate with locator device 102 using one of a number of wireless communication protocols, such as Wi-Fi or Bluetooth. Only a single wireless access point 106 is shown for simplicity. It should be understood that a typical system 100 may include multiple wireless access points 106 that are located at, for example, various restaurants, businesses, etc.

Network 108 may include one or more network elements that transfer data from one device to another. Network 108 may include, for example, the Internet, an ad hoc network, a local area network (LAN), a wide area network (WAN), a metropolitan area network (MAN), a public switched telephone network (PSTN), or any other network or group of connected networks.

Database server 110 may include one or more computer systems, including a database, with access to network 108. Database server 110 may store contact information associated with a subscriber of threat detection services and information identifying one or more locations that the subscriber designates for monitoring. Database server 110 may receive threat detection messages and store information from the threat detection messages in the database. Database server 110 may also retrieve the contact information relating to a received threat detection message.

Notification device 112 may include one or more devices that can receive a notification regarding a potential threat. For example, notification device 112 may include a computer device, such as a workstation, personal computer, or laptop computer, telephony, a personal digital assistant (PDA), a pager, etc. Notification device 112 may receive threat detection notifications in any format to be used for directly or indirectly notifying one or more predetermined parties of a detected threat.

Figure 2:
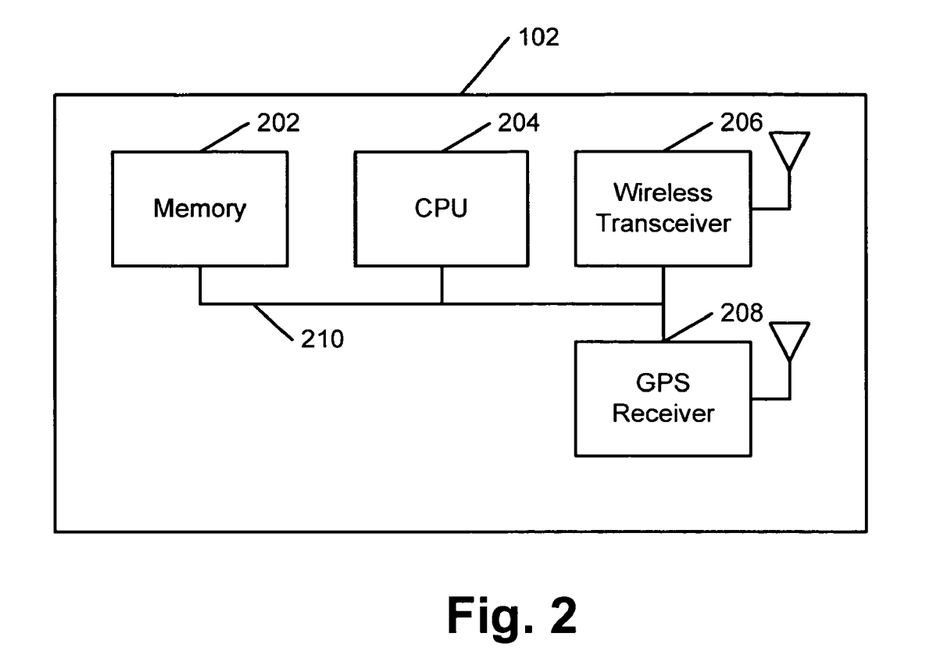
FIG. 2 illustrates a block diagram of an exemplary locator device of FIG. 1.

FIG. 2 illustrates an exemplary functional block diagram of locator device 102 of FIG. 1. Locator device 102 may include a memory 202, a central processing unit (CPU) 204, a wireless transceiver 206, a GPS receiver 208 and a communications interface 210, such as a bus. Memory 202 may include static memory, such as read only memory (ROM) for storing machine-readable instructions, and dynamic random access memory (DRAM) for working storage. Memory 202 may also include storage devices, such as a floppy disk, CD ROM, CD read/write (R/W) disc, flash memory, as well as other storage devices. CPU 204 may include one or more processors capable of controlling locator device 102. Wireless transceiver 206 may include a transmitter and receiver for communicating with wireless access points 106 via a wireless communications protocol. GPS receiver 208 may include a receiver for receiving signals from GPS satellites 104-1 through 104-3. Communications interface 210 provides an interface among components of locator device 102. Locator device may also include a power supply (not shown).

Figure 3:
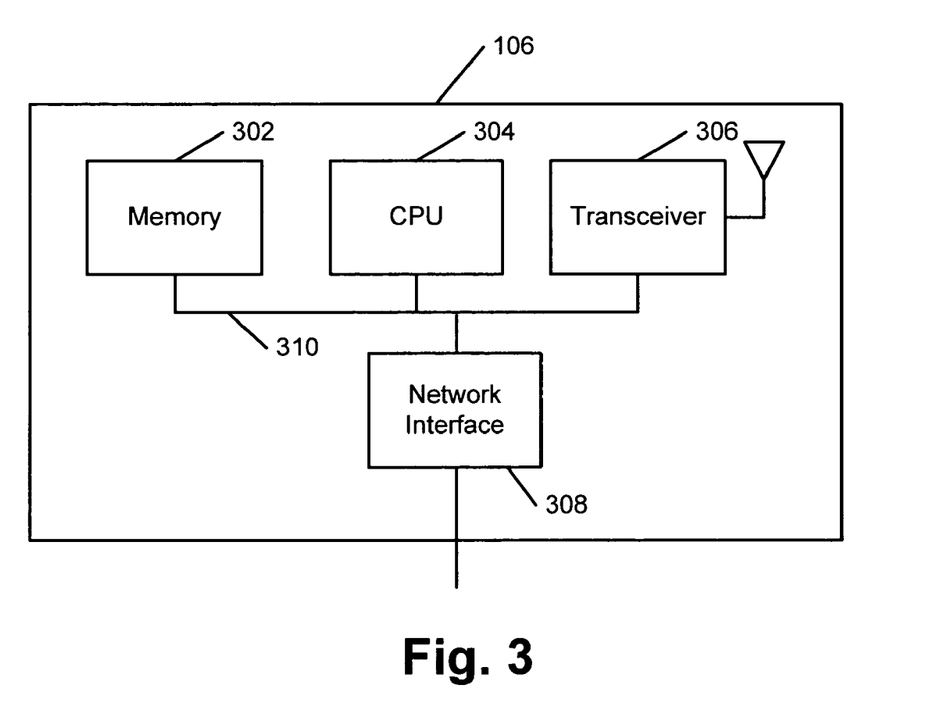
FIG. 3 illustrates a block diagram of an exemplary wireless access point of FIG. 1.

FIG. 3 illustrates an exemplary functional block diagram of wireless access point 106 of FIG. 1. Wireless access point 106 may include a memory 302, a CPU 304, a transceiver 306, a network interface 308, and a communications interface 310, such as a bus. Memory 302 may include static memory, such as a ROM for storing machine-readable instructions, and DRAM for working storage. Memory 302 may also include storage devices, such as a floppy disk, CD ROM, CD R/W disc, flash memory, as well as other storage devices. CPU 304 may include one or more processors capable of controlling wireless access point 106. Transceiver 306 may include a transmitter and receiver for communicating with locator devices 102 and network 108 via a wireless communications protocol. Network interface 308 may include a modem, an Ethernet interface or any other wired, wireless, and/or optical network interface.

Figure 4:
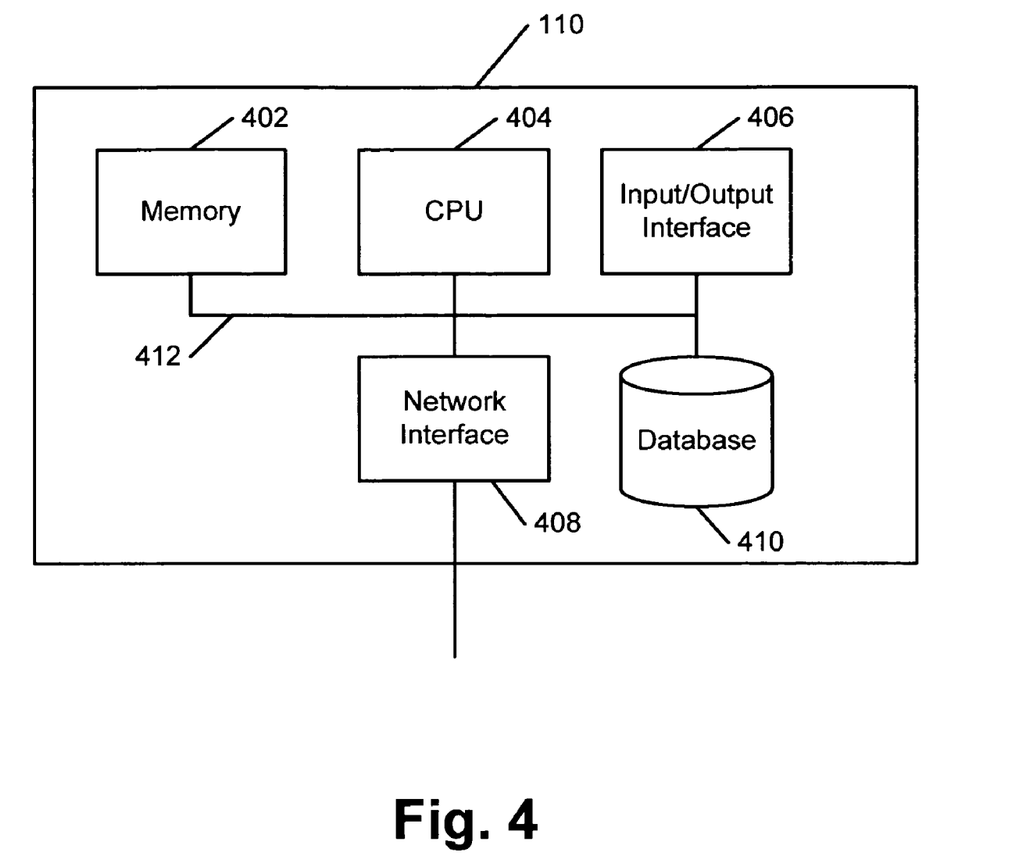
FIG. 4 illustrates a block diagram of an exemplary database server of FIG. 1.

FIG. 4 is an exemplary functional block diagram of database server 110 of FIG. 1. Database server 110 may include a memory 402, a CPU 404, an input/output interface 406, a network interface 408, a database 410 and a communications interface 412, such as a bus. Memory 402 may include static memory, such as ROM for holding machine-readable instructions, and DRAM for working storage. Memory 402 may also include storage devices, such as a floppy disk, CD ROM, CD R/W disc, flash memory, as well as other storage devices. CPU 404 may include one or more processors capable of controlling database server 110. Input/output interface 406 may provide an interface to a monitor, such as a CRT, a printer, a keyboard, and/or a mouse. Network interface 408 interfaces database server 110 to network 108 and may include a modem, an Ethernet interface or any other wired, wireless, and/or optical network interface.

Figure 5:
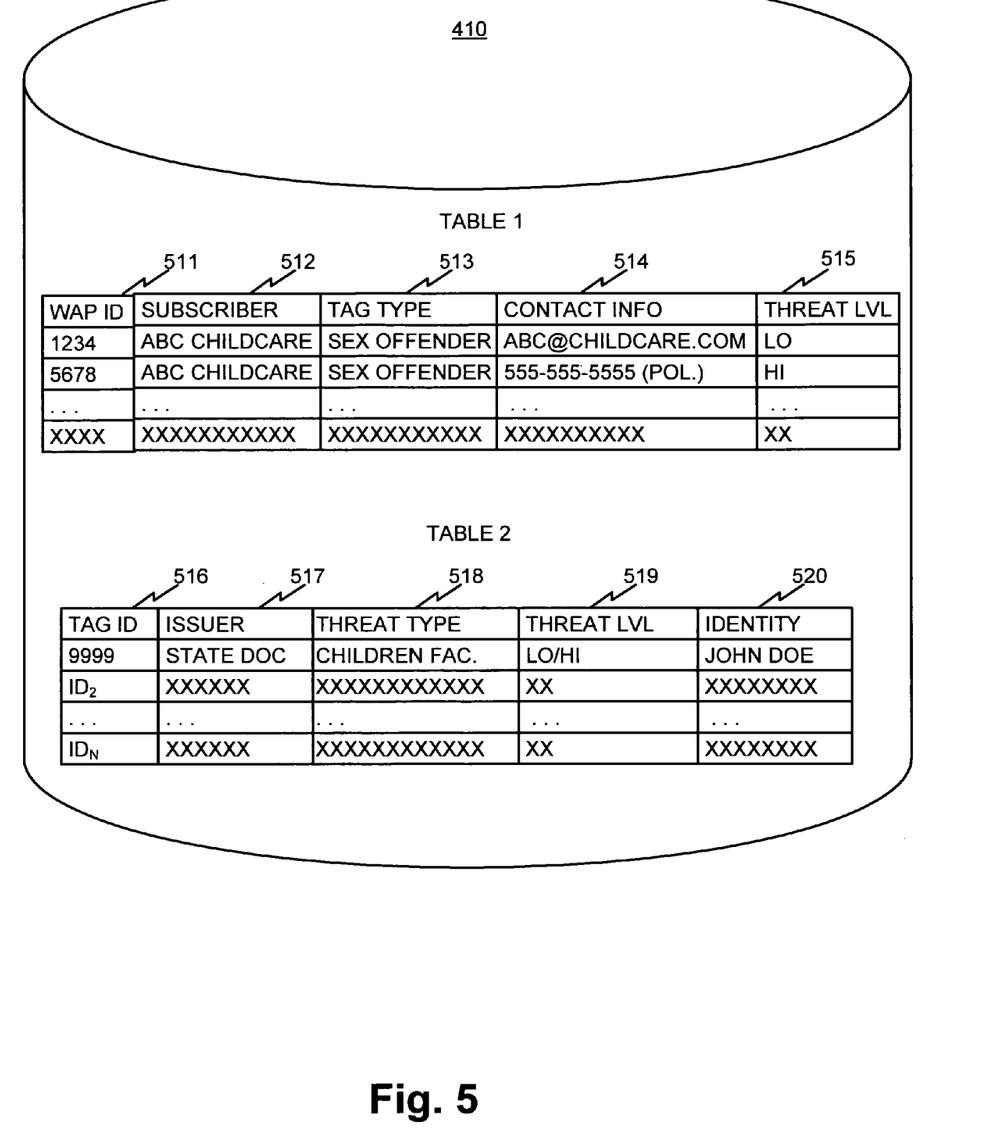
FIG. 5 illustrates a block diagram of an exemplary database of FIG. 4.

FIG. 5 is an exemplary functional block diagram of database 410 of FIG. 4. Database 410 may be a database configured to store information in any retrievable format, including one or more tables, etc. Exemplary Table 1 may include a wireless access point (WAP) identifier (ID) field 511, a subscriber field 512, a tag type field 513, a contact information field 514, a threat level field 515, and/or other information fields. For example, along with or alternatively to the tag type, a field in Table 1 may include a list of all the tag IDs to be monitored for by each WAP. WAP ID field 511 may store a character sequence that uniquely identifies wireless access point 106. Subscriber field 512 may store the name of the subscriber, subscriber facilities to be monitored, physical addresses of the facilities, and the like. Tag type field 513 may store one or more tag classifications from predefined tag classifications corresponding to the types of tags to be monitored for a particular WAP and/or subscriber facility. Contact information field 514 may store one or more contacts to which notifications may be communicated for a particular subscriber facility. Threat level field 515 may store one or more predefined threat level designations associated with a particular WAP and/or subscriber facility.

Exemplary Table 2 may include a locator device (tag) ID field 516, a tag issuer field 517, a threat type field 518, a threat level field 519, a threat identity field 520, and/or other information. Tag ID field 516 may store a character sequence that uniquely identifies locator device 102. Issuer field 517 may store the name of the entity responsible for issuing locator device 102. Threat type field 518 may store one or more threat classifications from predefined threat classifications corresponding to the types of threats for which locator device 102 is to be monitored. Threat level field 519 may store one or more predefined threat level designations associated with locator device 102. Threat identity field 520 may include a physical description of the threat, which may include a name, a physical description, one or more images, and/or contact information for the threat.

Figure 6:
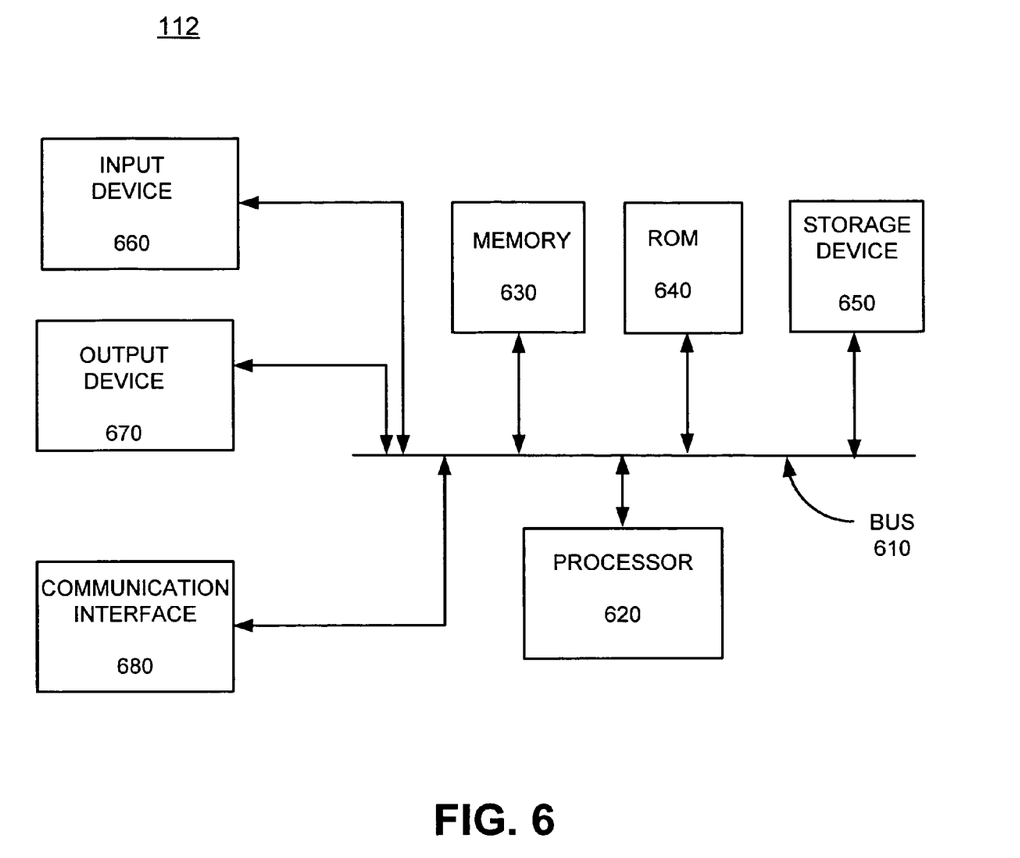
FIG. 6 illustrates a block diagram of an exemplary notification device of FIG. 1.

FIG. 6 is an exemplary functional block diagram of notification device 112 of FIG. 1. Notification device 112 may include a bus 610, a processor 620, a memory 630, a ROM 640, a storage device 650, an input device 660, an output device 670, and a communication interface 680. Other configurations are possible. Bus 610 permits communication among the components of notification device 112.

Processor 620 may include any type of processor or microprocessor that interprets and executes instructions. Memory 630 may include a random access memory (RAM) or another dynamic storage device that stores information and instructions for execution by processor 620. Memory 630 may also be used to store temporary variables or other intermediate information during execution of instructions by processor 620.

ROM 640 may include a ROM device and/or another static storage device that stores static information and instructions for processor 620. Storage device 650 may include a magnetic disk or optical disk and its corresponding drive and/or some other type of magnetic or optical recording medium and its corresponding drive for storing information and instructions.

Input device 660 may include one or more mechanisms that permit a user to input information to notification device 112, such as a keyboard, a mouse, a pen, voice recognition, and/or biometric mechanisms, etc. Output device 670 may include one or more mechanisms that output information to the user, including a display, a printer, one or more speakers, etc. Communication interface 680 may include any transceiver-like mechanism that enables notification device 112 to communicate with other devices and/or systems. For example, communication interface 680 may include a modem or an Ethernet interface to a LAN. Alternatively, communication interface 680 may include other mechanisms for communicating via a network.

Exemplary Processing

Figure 7:
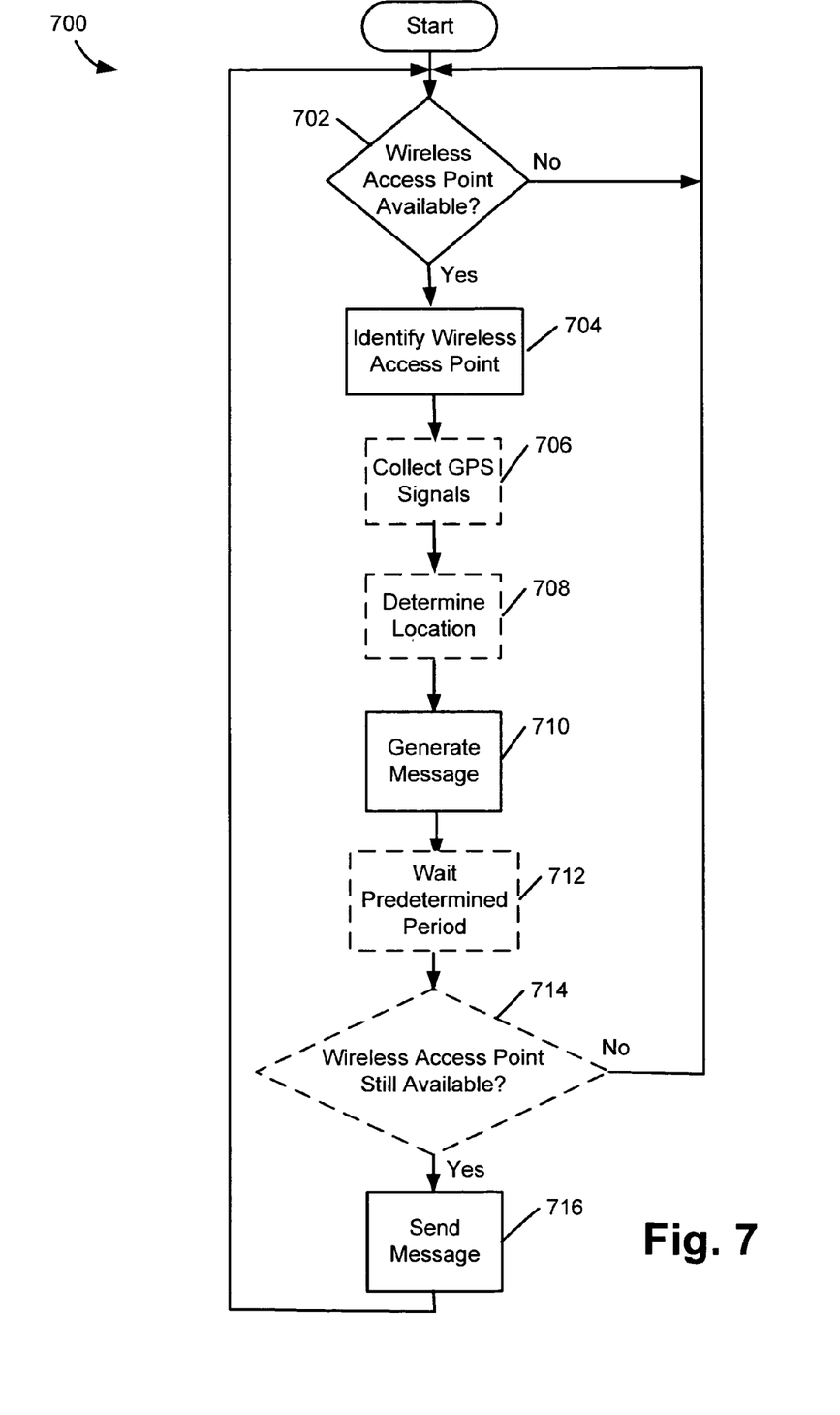
FIG. 7 is a flowchart of an exemplary procedure that may be performed by the locator device of FIG. 1.

FIG. 7 illustrates an exemplary procedure 700 that may be executed by locator device 102 in an implementation consistent with principles of the invention. In this implementation, a subscriber associated with a designated location may monitor the designated location, using wireless access point 106, for the presence of identified threats that have been "tagged" with locator device 102. For example, locator device 102 may be attached to an individual that has been deemed a threat to another individual or a particular segment of society, as a condition for the identified threat to be in public.

Locator device 102 may be configured to periodically transmit a signal in an attempt to communicate with wireless access point 106, i.e., determine whether wireless access point 106 is available (act 702). When an object to which locator device 102 is attached transports locator device 102 to within a communication range of wireless access point 106, a communication session may be established between locator device 102 and wireless access point 106.

In the established communication session, the identity of locator device 102 and/or wireless access point 106 may be communicated in an exchange of data that may include identification information (act 704). For example, identification information may include a unique identifier, such as an associated special service set identifier (SSID), a network Internet protocol (IP) address, etc.

According to one implementation, locator device 102 may receive GPS signals from GPS satellites 104-1, 104-2, and 104-3 (act 706), for example, using GPS receiver 208. Locator device 102 may determine its geographic location (e.g., coordinates) within the communication range of wireless access point 106 using the collected GPS signals (act 708). In another implementation, locator device 102 may identify wireless access point 106 (act 704) based on the GPS coordinates by, for example, cross-referencing a database that includes the geographic location of wireless access point 106.

Figure 8:
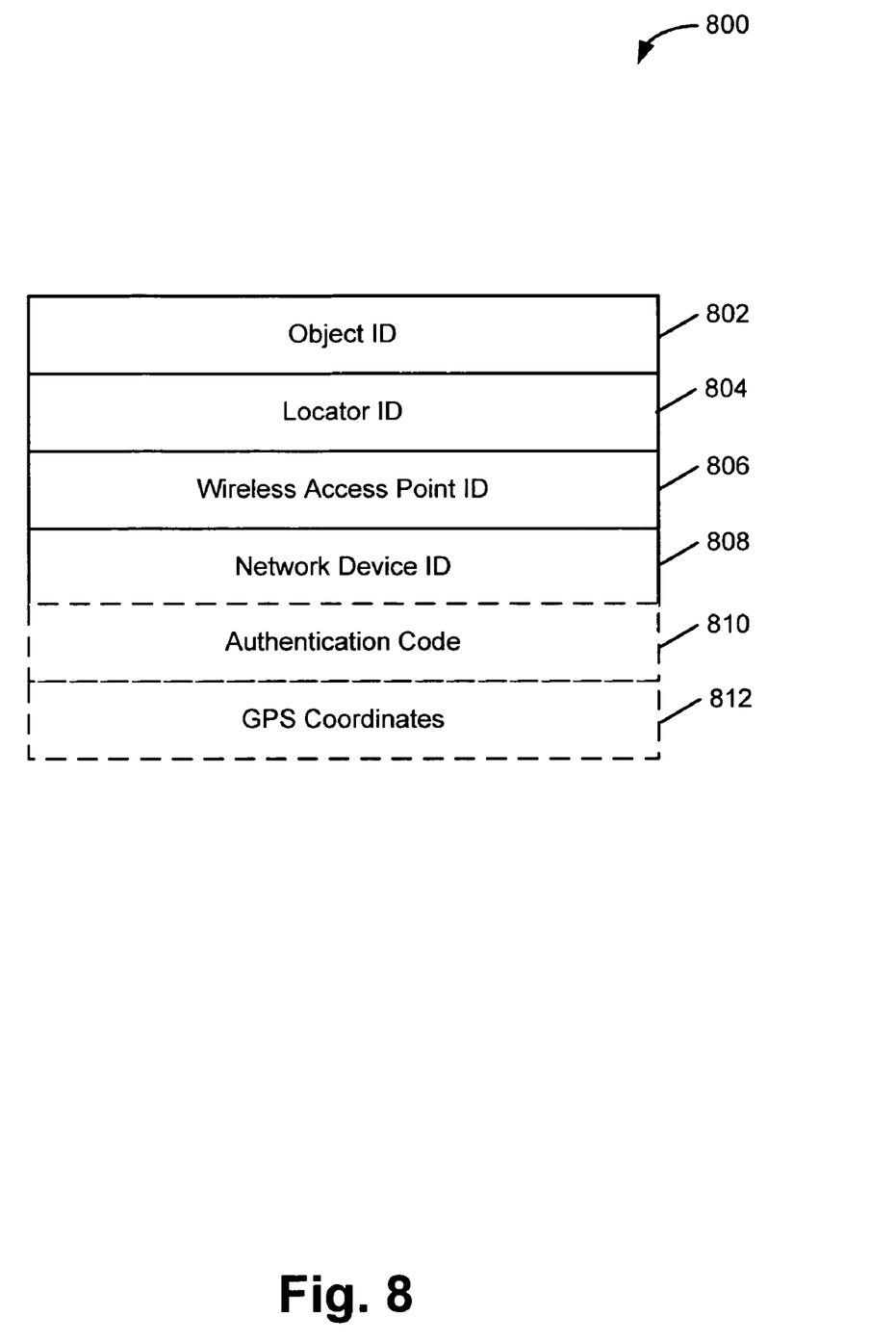
FIG. 8 is a block diagram of exemplary threat detection message that may be generated by the locator device of FIG. 1.

Locator device 102 may generate a threat detection message, using CPU 204, for example, based on the identity of wireless access point 106 (act 710). The threat detection message may be any format. FIG. 8 shows an exemplary threat detection message 800 that may be generated by locator device 102. As illustrated, threat detection message 800 may include an object ID 802 that identifies the object to which locator device 102 is attached, a locator ID 804 that identifies locator device 102, a wireless access point ID 806 that identifies wireless access point 106, and a network device ID 808 that identifies database server 110. In one implementation, threat detection message 800 may also include an authentication code 810 that may be a predefined code associated with locator device 102, which may be used by database server 110 to authenticate locator device 102. In another implementation, threat detection message 800 may also include GPS coordinates 812 determined for locator device 102.

Returning to FIG. 7, locator device 102 may be configured to wait a predetermined amount of time (act 712) before determining whether wireless access point 106 remains available (act 714). In some situations the subscriber's designated location and/or wireless access point 106 may be located near a through street or a high traffic area. In such an event, locator device 102 may establish a communication session with wireless access point 106 while, for example, merely passing through the communication range of wireless access point 106. Accordingly, locator device 102 may be configured to determine whether the established communication session is a transient session or a sustained session, corresponding to a transitory presence or a "lingering" presence, respectively, of the locator device (i.e., the object) in the monitored area (i.e., the communication range of wireless access point 106). In one implementation, when the predetermined time elapses and it is determined that locator device 102 is no longer within the communication range of wireless access point 106, locator device 102 may not send generated threat message 800. In another implementation, the delay of act 712 and the determination of act 714 occur before threat detection message 800 is generated, i.e., act 710.

If wireless access point 106 remains available (act 714), locator device 102 may send generated threat detection message 800 (act 716) to database server 110, for example, via wireless access point 106, using wireless transceiver 206. Database server 110 may process message 800, as explained in more detail below.

In some situations, the subscriber's designated location may be associated with multiple wireless access points. For example, a second wireless access point may be configured to have a communication range that covers an area that is nearer to the subscriber's designated location than the communication range of wireless access point 106. When the object transporting locator device 102 moves from the communication range of wireless access point 106 to the communication range of the second wireless access point, locator device 102 may end communication with wireless access point 106 to establish a communication session with the second wireless access point, in which case, the above described acts 702 through 716 may be repeated.

Figure 9:
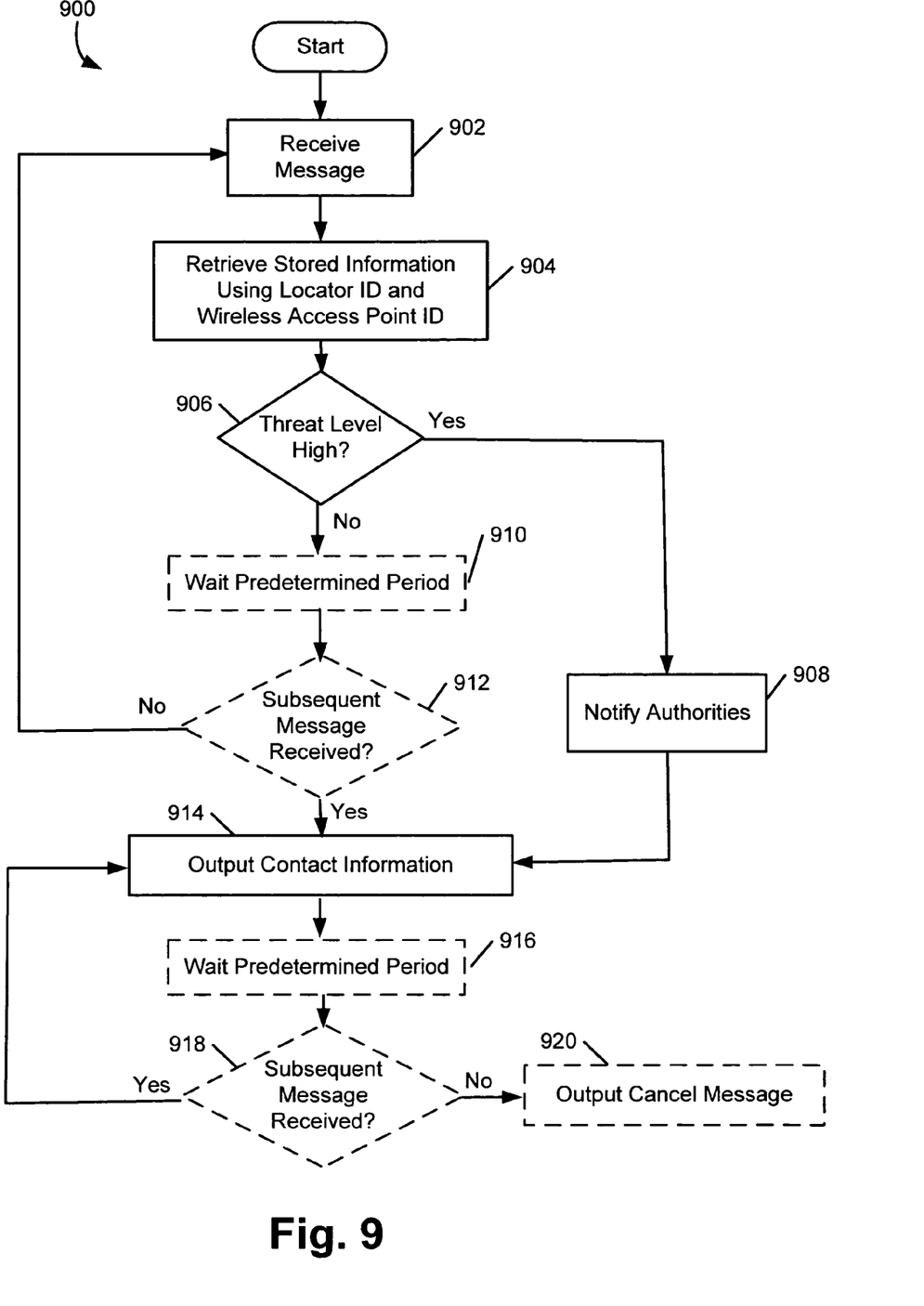
FIG. 9 is a flowchart of an exemplary procedure that may be performed by the database server of FIG. 1.

FIG. 9 illustrates a flowchart of an exemplary procedure 900 for database server 110 according to another implementation consistent with the principles of the invention. Database server 110 may receive threat detection message 800 from locator device 102 (act 902), for example, indicating that the object to which locator device 102 is attached is within a monitored area.

Database server 110 may authenticate received threat detection message 800 based on its header and payload information. For example, database server 110 may determine whether authentication code 810 in threat detection message 800 corresponds to an authentication code for that locator device 102 in database 410. If so, database server 110 may store information from threat detection message 800 in database 410. Database server 110 may use wireless access point ID 806 and locator ID 804 from threat detection message 800 to retrieve information associated with WAP ID field 511 and tag ID field 516 (act 904) stored in Tables 1 and 2, respectively.

Database server 110 may determine a threat level associated with the object based on threat detection message 800 and the stored information in threat level fields 515 and 519 (act 906). Where database server 110 determines that the threat level is sufficiently high, database server 110 may output contact information associated with a designated authority, such as law enforcement (act 908). Database server 110 may output the contact information from contact information field 514 to an output device, such as a display or printer. The contact information may include, for example, a telephone number, an e-mail address, an instant message address, a computer widget, a pager number, or a facsimile machine phone number. Alternatively, database server 110 may, for example, automatically place a telephone call, send an e-mail, a page, an instant message, or a facsimile to be communicated to a contact party designated by the subscriber, informing the contact of the presence of locator device 102 in the monitored area (act 914).

In one implementation, when the database server 110 determines that the threat level does not warrant notification of authorities (act 906), database server 110 may be configured to delay outputting contact information for a predetermined period of time (act 910). Database server 110 may be configured to determine whether the presence of the object within the monitored area is confirmed, based on whether a subsequent threat detection message 800 is received by database server 110 (act 912). Where no subsequent threat detection message 800 is received, processing may return to act 902 with database server 110 waiting for a new threat detection message 800 to be received. Where subsequent threat detection message 800 is received (act 912), the contact information may be outputted as described above (act 914).

In one implementation, after database server 110 outputs contact information (act 914), database server 110 may be configured to delay re-outputting contact information for a predetermined period (act 916). Database server 110 may be configured to determine whether the object remains within the monitored area based on whether a subsequent threat detection message 800 is received by database server 110 (act 918). Where a subsequent threat detection message 800 is received, database server 110 may output the contact information again as described above. Where no subsequent threat detection message 800 is received, database server 110 may be configured to output a cancel message to the contact party (act 920), informing the contact of the non-presence of locator device 102 in the monitored area.

EXAMPLES

Figure 10:
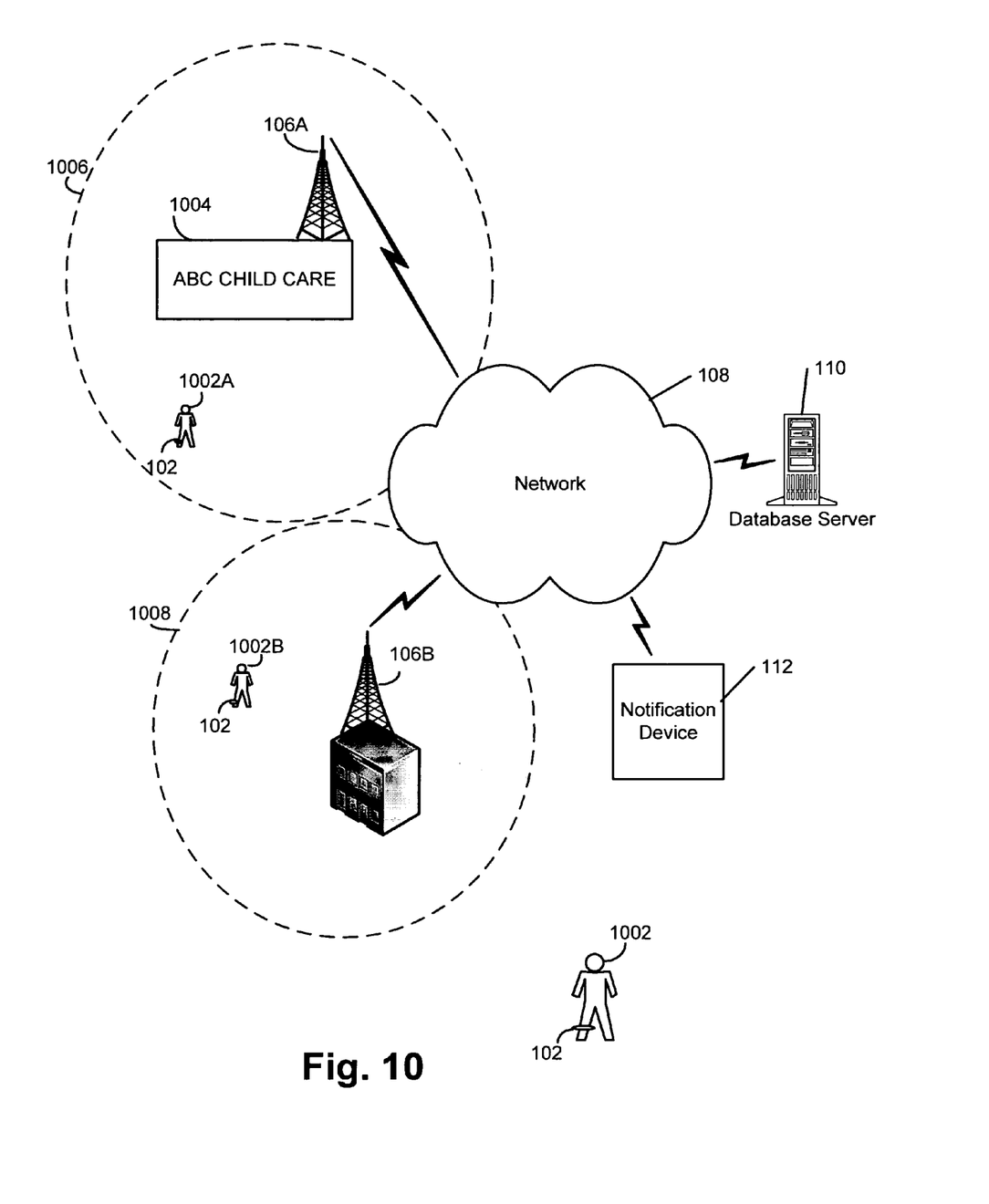
FIG. 10 illustrates an exemplary system consistent with the principles of the invention.

The following example illustrates the above processing. As shown in FIG. 10, locator device 102 may be attached to an individual 1002, named John Doe, who may have been identified as a threat. In this example, individual 1002 may be a convicted sex offender who is required by a government authority to wear a monitoring device, such as an electronic bracelet, which houses locator device 102, as a condition for freedom to be in the general public. The government authority may use a monitoring service provider to provide locator device 102 and, in doing so, provide relevant information concerning locator device 102 and individual 1002 to the monitoring service provider. The monitoring service provider may configure locator device 102. Alternatively, the government authority may provide locator device 102 itself, and provide relevant information concerning locator device 102 and individual 1002 to the monitoring service provider. In either case, the monitoring service provider may store the information provided in database 410 of database server 110.

A subscriber, "ABC Child Care," may use monitoring services of the monitoring service provider for a designated location 1004, e.g., a child care facility. The monitoring services may be related to identified threats to children, such as sex offenders like individual 1002. The monitoring service provider may store information concerning the subscriber and designated location 1004 in database 410 of database server 110.

Wireless access point 106A may be located on or near designated location 1004. Wireless access point 106A may be associated with the monitoring service provider or, alternatively, a third party. Wireless access point 106A may have an associated communication range 1006, within which wireless access point 106A can send and receive signals. The monitoring service provider may designate communication range 1006 as a first monitoring area associated with designated location 1004. The monitoring service provider may store information concerning wireless access point 106A in database 410 of database server 110.

Another wireless access point 106B may be located in the area of designated location 1004. Wireless access point 106B may have an associated communication range 1008, within which wireless access point 106B can send and receive signals. The monitoring service provider may designate communication range 1008 as a second monitoring area associated with designated location 1004. The second monitoring area may be associated with a lower threat level than the first monitoring area described above. The monitoring service provider may store information concerning the wireless access point 106B in database 410 of database server 110.

Assume that individual 1002 enters communication range 1008 (e.g., walking, by car, etc.), depicted as individual 1002B. Locator device 102 attached to individual 1002B may receive a signal from wireless access device 106B. A communication session may be established between locator device 102 and wireless access device 106B. Locator device 102 may receive identity information from wireless access device 106B. In one implementation, locator device 102 may acquire GPS signals from GPS satellites 104-1 to 104-3, and may determine a geographic location of individual 1002B.

Figure 11A:
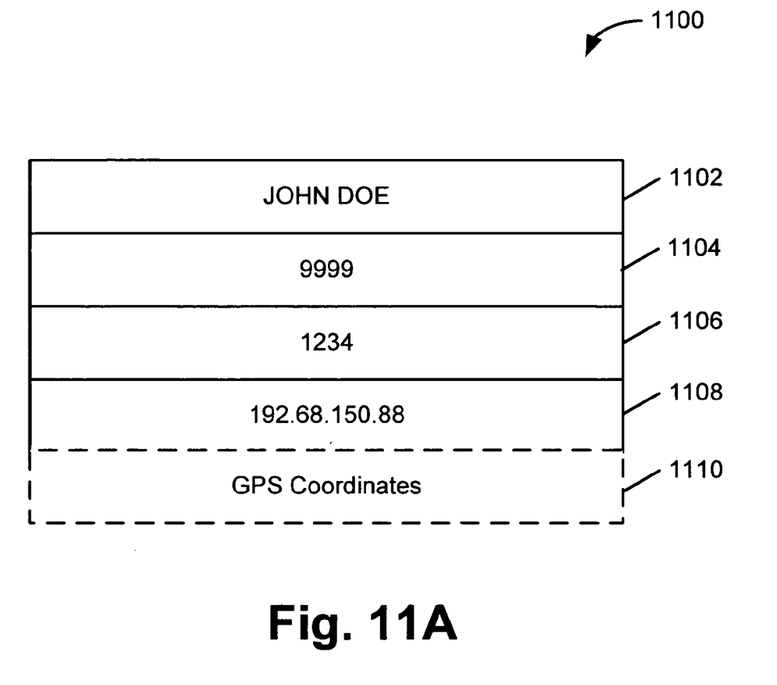
FIGS. 11A and 11B are block diagrams of exemplary threat detection messages that may be generated by the locator device of FIG. 10.

Locator device 102 may generate a threat detection message 1100 illustrated in FIG. 11A. As illustrated, threat detection message 1100 may include an object ID 1102 that identifies "John Doe" as the object to which locator device 102 is attached, a locator ID 1104 that identifies "9999" as locator device 102, a wireless access point ID 1106 that identifies "1234" as wireless access point 106, and a network device ID 1108 that identifies "192.68.150.88" as an IP address for database server 110. In one implementation, threat detection message 1100 may also include GPS coordinates 1110 determined for locator device 102.

Locator device 102 may send threat detection message 1100 to database server 110 via network 108. In one implementation, locator device 102 may wait a predetermined amount of time, and then confirm whether the communication session is maintained (i.e., whether individual 1002B remains within communication range 1008). Where the communication session has ended, threat detection message 1100 may not be sent (e.g., discarded). For this example, assume that individual 1002B remains within communication range 1008 beyond the predetermined amount of time. Threat detection message 1100 is sent to database server 110 at IP address, 192.68.150.88, included in threat detection message 1100.

Database server 110 may receive threat detection message 1100, for example, via network interface 408. Received threat detection message 1100 may be stored in memory 402. CPU 404 may process threat detection message 1100 using database 410.

CPU 404 may perform a lookup in Table 1 of database 410 using the WAP ID "1234" in threat detection message 1100. Information associated with WAP ID 1234 may include, subscriber, "ABC Child Care," tag type, "sex offender," contact information, "abc@childcare.com," and threat level, "Lo." CPU 404 may also perform a lookup in Table 2 of database 410 using TAG ID "9999" in threat detection message 1100. Table 2 may include information such as the issuer of tag 9999, "State Department of Correction (DOC)," the tag's associated threat type, "children's facilities," the tag's associated threat level, "Lo/Hi," the identity of individual 1002, "John Doe," as well as other information. Based on the lookup, CPU 404 may generate a threat notification to abc@childcare.com that may include any of the information stored in Tables 1 and 2. In one implementation, the threat notification may include geographic location information for individual 1002B based on GPS coordinates 1110 in threat detection message 1100.

Now, assume that individual 1002B proceeds from communication range 1008 to communication range 1006 associated with wireless access point 106A, depicted as individual 1002A. A communication session may be established between locator device 102 and wireless access device 106A. Locator device 102 may receive identity information from wireless access device 106A. In one implementation, locator device 102 may acquire GPS signals from GPS satellites 104-1 to 104-3, and may determine a geographic location of individual 1002A.

Figure 11B:
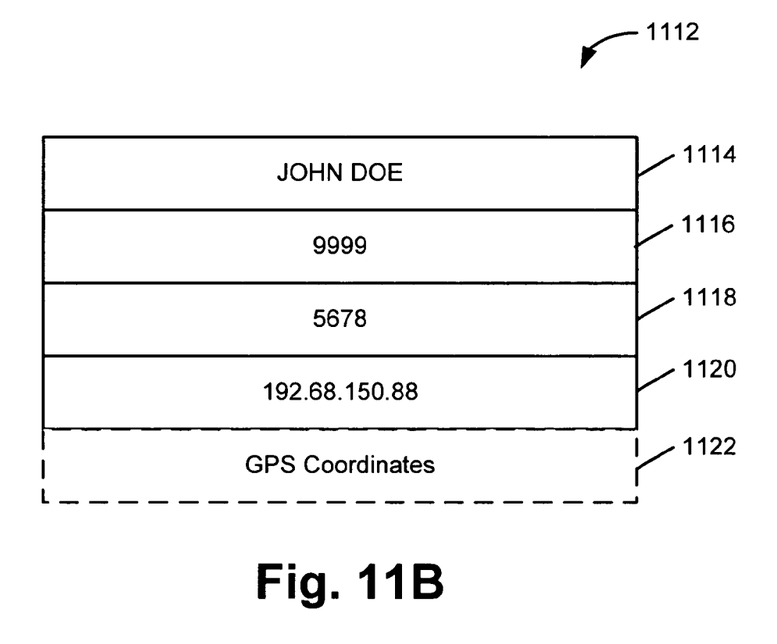

Locator device 102 may generate a threat detection message 1112 illustrated in FIG. 11B. Locator device 102 may access network 108 via wireless access point 106A. Locator device 102 may send threat detection message 1112 to database server 110 via network 108. Threat detection message 1112 is sent to database server 110 at IP address, 192.68.150.88, included in threat detection message 1112.

Database server 110 may receive threat detection message 1112, for example, via network interface 408. As illustrated, threat detection message 1112 may include an object ID 1114 that identifies "John Doe" as the object to which locator device 102 is attached, a locator ID 1116 that identifies "9999" as locator device 102, a wireless access point ID 1118 that identifies "5678" as wireless access point 106, and a network device ID 1120 that identifies "192.68.150.88" as the IP address for database server 110. In one implementation, threat detection message 1112 may also include GPS coordinates 1122 determined for locator device 102. Received threat detection message 1112 may be stored in memory 402. CPU 404 may process threat detection message 1112 using database 410.

CPU 404 may perform a lookup in Table 1 of database 410 using the WAP ID "5678" in threat detection message 1112. Information associated with WAP ID may include, subscriber, "ABC Child Care," tag type, "sex offender," contact information, "555-555-5555," (e.g., a telephone number for the local police), threat level, "Hi," as well as other information. CPU 404 may also perform a lookup in Table 2 of database 410 using TAG ID "9999" as with the lookup associated with communication range 1008. Based on the lookup, CPU 404 may generate a threat notification(s) to the contacts for the subscriber and the police, which may include any of the information stored in Tables 1 and 2. In one implementation, the threat notification(s) may include geographic location information for individual 1002A based on GPS coordinates 1122 in threat detection message 1112.

CONCLUSION

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 7, 9, and 10, the order of the acts may differ in other implementations consistent with the present invention. Also, non-dependent acts may be performed in parallel. In addition, some of the functions described as being performed by the locator device may be performed by the wireless access point. Some of the functions described as being performed by the wireless access point may be performed by the locator device.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit (ASIC) or a field programmable gate array, software, or a combination of hardware and software. While aspects have been described in terms of processing messages or packets, these aspects may operate upon any type or form of data, including packet data and non-packet data.

No element, act, or instruction used in the description of the present invention should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A method comprising:
   receiving a message, the message including information identifying a locator device, a location of the locator device, and a wireless access point that is available to the locator device;
   determining whether the locator device is within a monitored area defined by a communication range associated with the wireless access point based on the location information;
   retrieving contact information based on the identified locator device and the identified wireless access point when the locator device is determined to be within the monitored area;
   retrieving information identifying an object associated with the locator device based on the locator device identity;
   generating a notification using the retrieved contact information, the notification identifying the object;
   communicating the notification to a contact associated with the wireless access point and identified in the retrieved contact information;
   waiting a predetermined amount of time in which to receive a subsequent message via the wireless access point; and
   generating a subsequent notification after the predetermined amount of time lapses when the subsequent message is not received.

2. The method of claim 1, wherein the location information comprises:
   global positioning system (GPS) information acquired by the locator device.

3. The method of claim 1, wherein the receiving the message occurs upon establishment of a communication session between the locator device and the wireless access point.

4. The method of claim 1 further comprising:
   receiving another message via the wireless access point, the other message being received prior to the communicating the notification.

5. The method of claim 1 further comprising:
   determining an action level associated with the notification based on at least one of the object or the monitored area; and
   communicating the notification to a second contact identified in the retrieved contact information based on the determined action level.

6. The method of claim 1 further comprising:
   receiving a subsequent message via a second wireless access point, the subsequent message including information identifying the locator device and information identifying a subsequent location of the locator device;
   determining whether the locator device is within a second monitored area based on the subsequent location information; and
   generating another notification when the locator device is determined to be within the second monitored area.

7. The method of claim 6, further comprising:
   communicating the other notification to the contact, and communicating the other notification to a second contact identified in the retrieved contact information.

8. The method of claim 7, wherein the second contact includes a law enforcement agency.

9. A network device comprising:
   a database to store information associated with a locator device and an object associated with the locator device, and information associated with a wireless access point having a communication range that defines a monitored area; and
   logic to:
      receive a message from the locator device via the wireless access point, the message including information identifying the locator device, a location of the locator device, and the wireless access point,
      determine whether the locator device is within the monitored area based on the location information,
      retrieve contact information based on the identified locator device and the identified wireless access point when the locator device is determined to be within the monitored area,
      retrieve the stored information associated with the object based on the locator device identity,
      generate a notification using the retrieved contact information, the notification identifying the object,
      transmit the notification to a contact associated with the wireless access point and identified in the retrieved contact information,
      wait a predetermined amount of time in which to receive a subsequent message via the wireless access point, and
      generate a subsequent notification after the predetermined amount of time lapses when the subsequent message is not received.

10. The network device of claim 9, wherein the logic is further configured to:
    wait until another message is received from the locator device via the wireless access point before transmitting the notification.

11. The network device of claim 9, wherein the logic is further configured to:
    determine an action level associated with the presence of the object in the monitored area based on at least one of the monitored area or the object; and
    transmit the notification to a second contact associated with the monitored area, based on the determined action level.

12. The network device of claim 11, wherein the second contact includes a law enforcement agency.

13. The network device of claim 9, wherein:
    the database is further configured to store information associated with another wireless access point having a different communication range that defines a second monitored area; and the logic is further configured to receive a subsequent message from the locator device via the other wireless access point indicating that the locator device has entered the second monitored area, and generate another notification based on the subsequent message, the other notification indicating the presence of the object within the second monitored area.

14. The network device of claim 13, the logic being further configured to:

transmit the other notification to the contact and a second contact identified in the stored information associated with the second monitored area.

15. The network device of claim 9, the logic being further configured to:

determine a geographic location of the object relative to the monitored area based on global positioning system (GPS) information included in the message.

16. The network device of claim 15, the notification further indicating the determined geographic location.

17. The network device of claim 15, the logic being further configured to:

transmit the notification to a law enforcement agency based on the determined geographic location.

18. A server comprising:

means for receiving a message, the message including an identifier for a locator device, an identifier for a wireless access point, and information identifying a location of the locator device relative to a communication range of the wireless access point;

means for determining whether the locator device is within a designated area of the communication range based on the locator identifier and the wireless access point identifier;

means for retrieving contact information based on the locator identifier and the wireless access point identifier when the locator device is determined to be within the designated area;

means for retrieving information identifying an object associated with the locator device based on the locator identifier;

means for generating a notification using the retrieved contact information, the notification identifying the object;

means for communicating the notification to a contact associated with the wireless access point and identified in the retrieved contact information;

means for waiting a predetermined amount of time in which to receive a subsequent message via the wireless access point; and means for generating a subsequent notification after the predetermined amount of time lapses when the subsequent message is not received.

* * * * *